(12) United States Patent
Fry

(10) Patent No.: US 7,133,759 B2
(45) Date of Patent: Nov. 7, 2006

(54) ELECTRONIC CONTROL APPARATUS FOR A VEHICLE

(75) Inventor: Mathew Fry, Bristol (GB)

(73) Assignee: Knorr-Bremse Systems for Commercial Vehicles Limited, Bristol (GB)

( * ) Notice: Subject to any disclaimer, the term of this patent is extended or adjusted under 35 U.S.C. 154(b) by 102 days.

(21) Appl. No.: 10/641,098

(22) Filed: Aug. 15, 2003

(65) Prior Publication Data
US 2004/0093143 A1   May 13, 2004

(30) Foreign Application Priority Data
Nov. 12, 2002 (GB) ................................ 0226386.1

(51) Int. Cl.
G06F 19/00 (2006.01)
G06F 7/70 (2006.01)
G06F 7/00 (2006.01)
G06F 7/76 (2006.01)

(52) U.S. Cl. .................... 701/70; 701/84; 701/100; 701/104; 123/299; 123/305; 123/436; 123/446; 123/478; 123/490; 123/682

(58) Field of Classification Search .................. 701/70, 701/84, 100, 104; 123/198 D, 198 DB, 299, 123/305, 436, 446, 478, 490, 492, 682; 239/88; 417/212
See application file for complete search history.

(56) References Cited

U.S. PATENT DOCUMENTS 5,647,317 A * 7/1997 Weisman et al. ........... 123/299
5,667,286 A * 9/1997 Hoying et al. .............. 303/140
5,766,486 A * 6/1998 Cathcart et al. ............ 210/739
5,941,919 A   8/1999 Pastor et al.
6,536,402 B1 * 3/2003 Houchin et al. ........ 123/198 D

FOREIGN PATENT DOCUMENTS

| DE | 297 11 887 U1 | 9/1997 |
| DE | 197 16 197 A1 | 10/1998 |
| EP | 0 794 519 A1 | 9/1997 |
| EP | 1 167 147 | 1/2002 |
| GB | 2 277 999 | 11/1994 |

OTHER PUBLICATIONS

U.S. Department of Transportation, Technician guidelines for antilock braking systems, 1998, Internet, p. 1-45.*
U.S. Department of Transportation, Technology review for electronically controlled braking systems, 1998, Internet, p. i-A-l 14.*
Cho et al., Design and implementation of HILS system for ABS ECU of commercial vehicles, 2001, IEEE, p. 1272-1277.*
Scania, Scania Retarder: Brake use drops by up to 80/%, 1997, Internet, p. 1.*

* cited by examiner

Primary Examiner—Thomas G. Black
Assistant Examiner—McDieunel Marc
(74) Attorney, Agent, or Firm—Crowell & Moring LLP

(57) ABSTRACT

Electronic control apparatus for a vehicle, in particular a heavy goods vehicle, which apparatus includes an electronic control unit (ECU) adapted to control actuation of vehicle brakes. The ECU has a non volatile storage memory for storing braking related control parameters particular to the vehicle and a discretely programmable storage device to carry operating data for one or more auxiliary functions of the vehicle. The ECU is operable to check one or more incoming and outgoing variables and control algorithms against a predefined list such as to safeguard the braking function against error modes.

6 Claims, 2 Drawing Sheets

ELECTRONIC CONTROL APPARATUS FOR A VEHICLE

BACKGROUND AND SUMMARY OF THE INVENTION

The invention relates to electronic control apparatus for a vehicle and in particular, but not exclusively, to control equipment for commercial vehicles.

Heavy commercial vehicles are now designed and built with electronic control units (ECU[1]s). These are responsive to control signals initiated by the drive of a towing vehicle to control valves of a pneumatic circuit to apply braking pressure from a compressed air reservoir to brake actuators of braked wheels. Such an ECU may include anti-lock brake pressure modulation means (ABS) operable to adjust braking pressure according to sensed wheel adhesion loss on respective sides of the vehicle.

One such ECU is described in EP1167147, in which the ECU comprises a main data memory and electronics for specific braking related vehicle parameters. The memory is parameterized by the trailer builder using specialized equipment to enable the function of the ECU to be matched to the particular vehicle. This is analogous to the setting up of a conventionally mechanically operable variable load valve in a purely pneumatic system.

Customers and operators of trailer vehicles are increasingly requiring trailer electronic control apparatus to be adapted to control other functions. Different operators require different functions according to the manner of use of their trailers. Provision of special controls for different customers can be relatively costly for trailer builders and suppliers and, in each case, due consideration has to be given to the safety critical nature of the core system which controls the brakes.

The present invention seeks to provide a control apparatus for a vehicle which addresses the above problem According to the invention, there is provided a control apparatus for a vehicle, which apparatus comprises an electronic control unit adapted to control actuation of vehicle brakes, which ECU has non volatile storage memory for storing braking related control parameters particular to the vehicle, wherein the ECU further comprises discretely programmable storage device to carry operating data for one or more auxiliary functions of the vehicle and is operable to check one or more incoming and outgoing variables and control algorithms against a predefined list such as to safeguard the braking function against error modes.

BRIEF DESCRIPTION OF THE DRAWINGS

Exemplary embodiments of the invention will now be described in greater detail with reference to the drawings, in which.

DETAILED DESCRIPTION OF THE DRAWINGS

Figure 1:
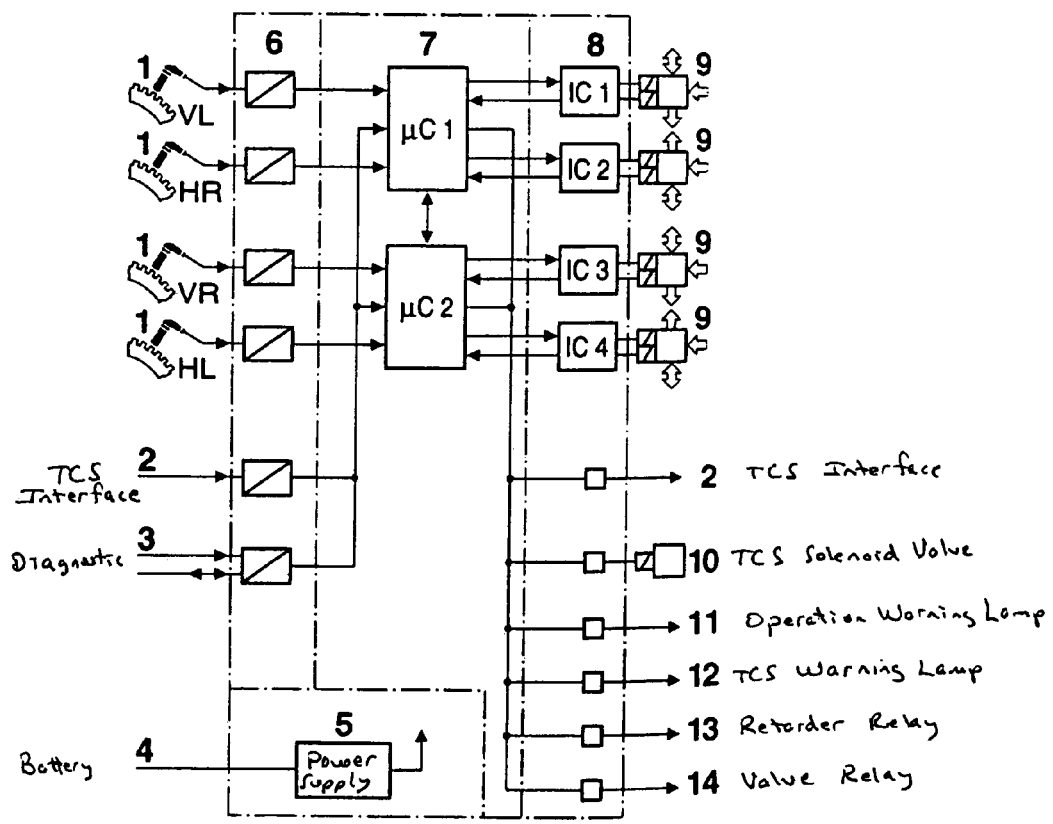
FIG. 1 shows a schematic of an ECU for a commercial vehicle brake system.

FIG. 1 shows a schematic of an electronic control unit (ECU) for a commercial vehicle brake system, comprising a plurality of wheel speed sensors 1, with one sensor associated with each of the vehicle wheels. The output of the wheel speed sensors 1 is fed to the ECU via a respective input stage 6, which is then fed to a respective one of two microcomputers 7, which microcomputers include a RAM for volatile memory storage and an EEPROM for programmable non-volatile memory storage. The two microcomputers 7 are adapted to talk to one another for reasons of redundancy. The microcomputers 7 then communicate with output stages 8, which output stages 8 are, in turn, adapted to control a respective pressure control valve 9, which in use will control the application of pressure to the vehicle brakes. A warning lamp 11 is also provided to inform the driver when the system is operating.

Such an ECU is also often used to provide elements of traction control. In the example shown in FIG. 1, the ECU is provided with a Traction Control System (TCS) engine-management interface 2 and self diagnosis means 3. The output of the microcomputers 7 can then be fed to the TCS solenoid valve 10, TCS warning lamp 12. The ECU also comprises a power supply 5 driven from the vehicle battery 4 and a retarder relay 13 and valve relay 14.

The ECU will also be fed input from a variety of sensors on the vehicle including various pressures in the brake system such as: driver demand pressure, main system pressure and actual output brake pressure; vehicle reference speed, pad wear sensors and others. The permitted values for these detected sensor outputs are stored in a table, which the control software for the ABS calls to ensure that the system is working correctly.

The ECU comprises an EEPROM as a non-volatile storage memory, in which the memory is divided into two blocks. The first block includes the main safety critical control parameters, in particular those related to the actuation and operation of the vehicle brakes. The second block of memory includes a discretely programmable storage device for carrying operating data relating to one or more auxiliary functions. To be able to take the real data from the vehicle wheels As the electronic control apparatus controls a safety critical system, the design language and interpreter should not cause any failures that would result in a loss of system performance or availability.

The following design constraints upon the language and interpreter are desirable to avoid such problems.

Loops and iterations should not be allowed to avoid the risk that the program can end up in an endless loop, which could potentially affect or even disable brake functions. Process and control variables from the main control algorithms should only be accessed through a predefined list. The main control algorithms are designed to control such auxiliary functions as Lift Axle Control, the Integrated Speed Switch and Reset to Ride functions. The control language shall not be able to write to any area of memory other than the one reserved for the language interpreter. The language interpreter shall range check all input and output variables. Ideally, the language shall only allow simple constructs and, if more complex constructs are required, they should be made up of multiple simple constructs. To help ensure simplicity, all instructions could have the same number of bytes.

The auxiliary design language/interpreter (ADL) is a sub-process of the auxiliary function subsystem and is stored on the EEPROM. This subsubsystem includes the language interpreter which is designed to process the input data from a measured value table, which is defined in a diagnostic system of the brake system and from a CAN bus interface and from an auxiliary subsystem.

The ADL program is split into a number of processes. The instruction set or op codes comprise the set of Boolean operators (AND, OR etc) and certain simple mathematical operators (greater than, equals etc.). The first process is ADL_control which is adapted to initiate the program and read the process operating code and control the other processes. The other processes include put operands, convert operands, timer controls, counter controls, set-reset latch (SRLatch) control.

The ADL interpreter has a duplicity of timers, each having the elements (Read) TimerValue/(Write) Timer Preset; Run; Reset; Output. The Timer Value is incremented once per 50 ms if the Run bit is set. The output bit is set if the timer exceeds the Timer Preset. The counter control has a duplicity of counters each comprising the elements: Counter Value; Increment; Decrement; Reset.

A duplicity of SRLatches with a clock are provided, each comprising the elements: Set; Reset; Clock; Output. The Output is set on the rising edge of the "Set" input. The Output is set on the rising edge of the Reset input. The Output is toggled on the rising edge of the "Clock" Input. The process ConvertOperands converts the two input operands into three real values. If the op code has the immediate bit set, then the input operands need no conversion. If not, then the operand is used as an index in the register table. The Put Operand process returns the result into the register table.

Figure 2:
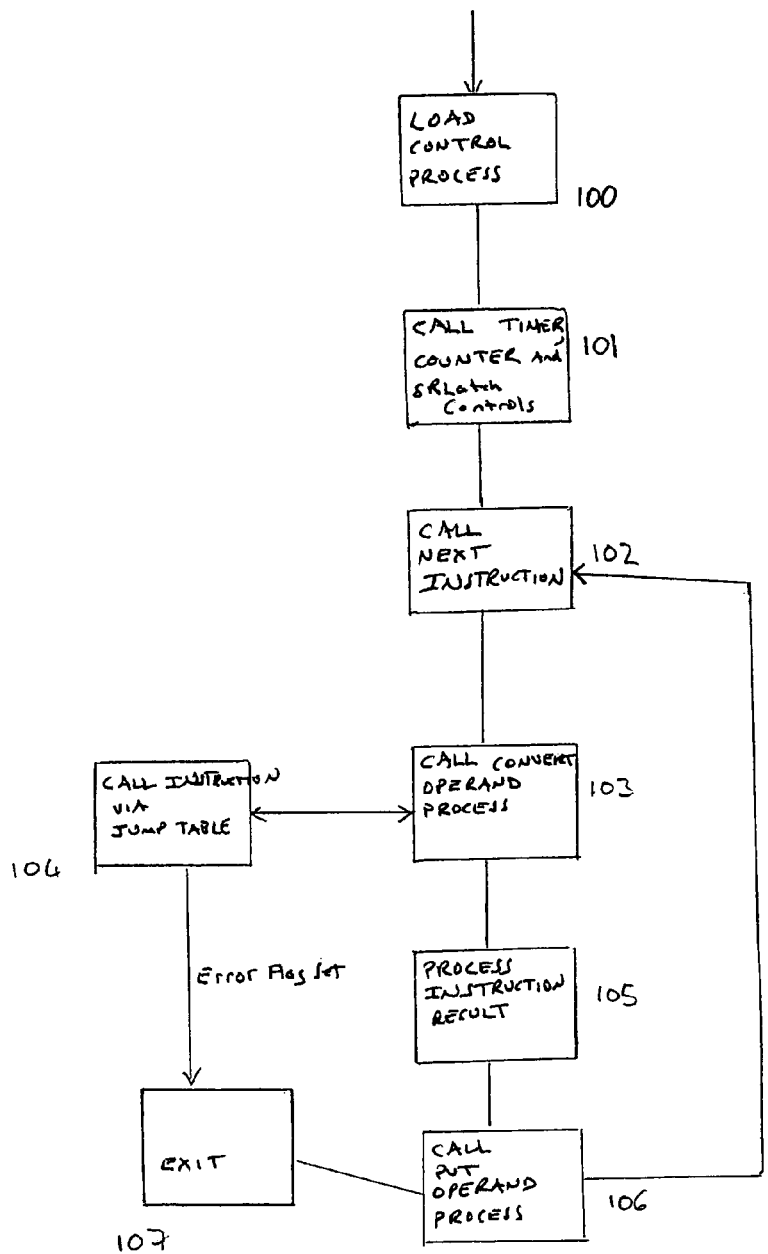
FIG. 2 shows a generic method according to the invention.

FIG. 2 shows the main processes of the language interpreter in use. In step 100, the ADL_control process is initially loaded into RAM from the EEPROM by a load module until the process is complete. This process is called from the 50 ms Task. As each instruction is conveniently four bytes in length, the program takes 2.5 s to load. Once the program is loaded into RAM, the program_init_complete flag is set and processing of instructions can begin. As an initial step, step 101, the timer, counter and SRLatch controls are called in order for the control elements to be updated.

In the next step 102, the process calls the next instruction. This consists of the op code followed by a three operands. The next step is to call the convert operand process 103, which process converts operand 1 and 2 into "real" data. The actual type of instruction is then decoded to an op code and the required instruction is called via a jump table 104. In step 105, the result of the instruction is processed and if the op code has a return value, then the Put Operand process is called at step 106 to return operand 3 to the required location. If the op code indicates that the instruction is the last instruction of the sequence, then the interpreter exits at 107, otherwise the interpreter then returns to step 102.

In view of the safety critical nature of the application, the interpreter, when processing the instruction in step 104 checks to see if the requested function in the jump table falls within an allowed range. If the requested function falls outside the range, then an InstructionError flag is set and the process exits at 107 to ensure that braking remains unaffected. If the InstructionError flag is not set then the instruction is processed at step 106 as described above.

Although the process has been described with each instruction having four bytes, it would be possible for the instructions to be longer than this depending on the processor speed and configuration. Four bytes was chosen to provide a useful amount of data whilst keeping run time to a minimum.

The example below shows how the interpreter can be used to solve the problem of operating an integrated speed switch (ISS). A typical application of an ISS is to control steering axles on a trailer or semi-trailer, which are to be locked at certain speeds. Whenever the speed rises or falls below a certain threshold, then the switching condition of the output will change and can be used to control solenoid valves, for example. In general an ISS will require an hysterisis of 1 km/h.

| No | OP Code | Operand 1 | Operand 2 | Operand 3 | Notes |
|---|---|---|---|---|---|
| 1 | SUB | 10 | 1 | REG1 | REG1 = 10 − 1, REG1 contains the Switch speed − hys (1 Km/h) |
| 2 | MULT | REG1 | OP1 | REG1 | REG1 = REG1 * OP1 REG1 contains the Switch speed value required for switch off if the output is on. |
| 3 | NOT | OP1 | NULL | REG2 | REG2 = !OP1 Load Register with the opposite state of OP1 |
| 4 | MUL | 10 | REG2 | REG3 | REG3 = 10 * REG2 REG3 contains the Switch speed value required for switch on if the output is off. |
| 5 | SLH | REG1 | REG3 | REG4 | Reg4 contains the highest value of REG1 And REG3. |
| 6 | GT | V_REF | REG4 | OP1 | If V_REF > REG4 OP1 = TRUE, else OP1 = FALSE |

The next example is a reset to ride function (RTR). The RTR function is used to reset the air suspension of a trailer to the normal (ride) position. When the vehicle velocity exceeds 10 Km/h, an output is switched on for 10 seconds, once complete the function is suspended until the vehicle velocity is zero for 30 seconds.

| No | OP Code | Operand | | | Notes |
|---|---|---|---|---|---|
| 1 | INIT | 200 | NULL | T1_TAR | During the first cycle initialize Timer 1 target value |
| 2 | INIT | 625 | NULL | T2_TAR | During the first cycle initialize Timer 2 target value |
| 3 | GT | V_REF | 10 | SRL1_S | If V_REF > 10 SRL1_S = TRUE |
| 4 | EQLS | SRL1_OP | NULL | T1_RUN | T1_ST = SRL1_OP Start Timer if SRL1_OP is non zero |
| 5 | XOR-L | SRL1_OP | T1_OP | OP1 | OP1 = SRL1_OP XOR T1_OP The output is on while SRL_OP = true and the timer has not timed out the output will be on. |
| 6 | NEQL | V_REF | 0 | T2_R | If V_REF != 0 reset timer 2 |
| 7 | EQL | V_REF | 0 | T2_RUN | If V_REF == 0 start timer 2 |

-continued

| No | OP Code | Operand | | Notes | |
|---|---|---|---|---|---|
| 8 | EQL | T2_OP | 1 | SRL1_R | Reset SRL1 |
| 9 | EQL | T2_OP | 1 | T1_R | Reset Timer1 |

The invention claimed is:

1. Control apparatus for a vehicle, the apparatus comprising:
an electronic control unit adapted to perform a braking function by controlling actuation of vehicle wheel brakes, the ECU having a non volatile storage memory for storing vehicle wheel braking related control parameters particular to the vehicle; and
wherein the ECU further comprises a discretely programmable storage device to carry operating data for one or more auxiliary functions of the vehicle, the ECU being operable to check one or more incoming and outgoing variables and control algorithms against a predefined list so as to safeguard the braking function of the ECU against error modes in the ECU.

2. Control apparatus according to claim 1, wherein the discretely programmable storage device carries a control language and an interpreter for the control language.

3. Control apparatus according to claim 2, wherein the interpreter is adapted to range check input and/or output variables against a predefined list of allowable values and, if a value of the input and/or output variables lies outside allowable limits, the interpreter terminates an instruction of the control language.

4. Control apparatus according to claim 2, wherein the control language can only write to an area of memory reserved to the interpreter.

5. Control apparatus according to claim 2, wherein the control algorithms comprise predefined instruction sets.

6. Control apparatus according to claim 5, wherein each instruction of the predefined instruction sets has the same number of bytes.

* * * * *